United States Patent

[11] 3,626,807

| [72] | Inventor | Kenneth B. Shartzer<br>2416 Randolph Road, Janesville, Wis. 53545 |
|---|---|---|
| [21] | Appl. No. | 870,497 |
| [22] | Filed | Oct. 21, 1969 |
| [45] | Patented | Dec. 14, 1971 |

[54] ADJUSTABLE STROKE CYLINDERS
8 Claims, 2 Drawing Figs.

[52] U.S. Cl..................................................... 91/1,
91/26, 91/394, 92/13.6
[51] Int. Cl..................................................... F15b 15/22
[50] Field of Search........................................... 91/26, 1,
394, 396; 92/13.6

[56] References Cited
UNITED STATES PATENTS

| 3,150,562 | 9/1964 | Allgeyer...................... | 91/26 |
| 3,463,188 | 8/1969 | Ryan et al.................... | 91/26 |

*Primary Examiner*—Paul E. Maslousky
*Attorney*—Dirk J. Veneman

ABSTRACT: A simple and reliable hydraulic or pneumatic cylinder is provided with an axially adjustable internal head which permits highly accurate selective variation of the stroke of the cylinder piston. A piston-cushioning device is carried by the adjustable head and can be regulated independently of the stroke adjustment to control the cushioning of the piston at the end of its stroke.

Patented Dec. 14, 1971
3,626,807
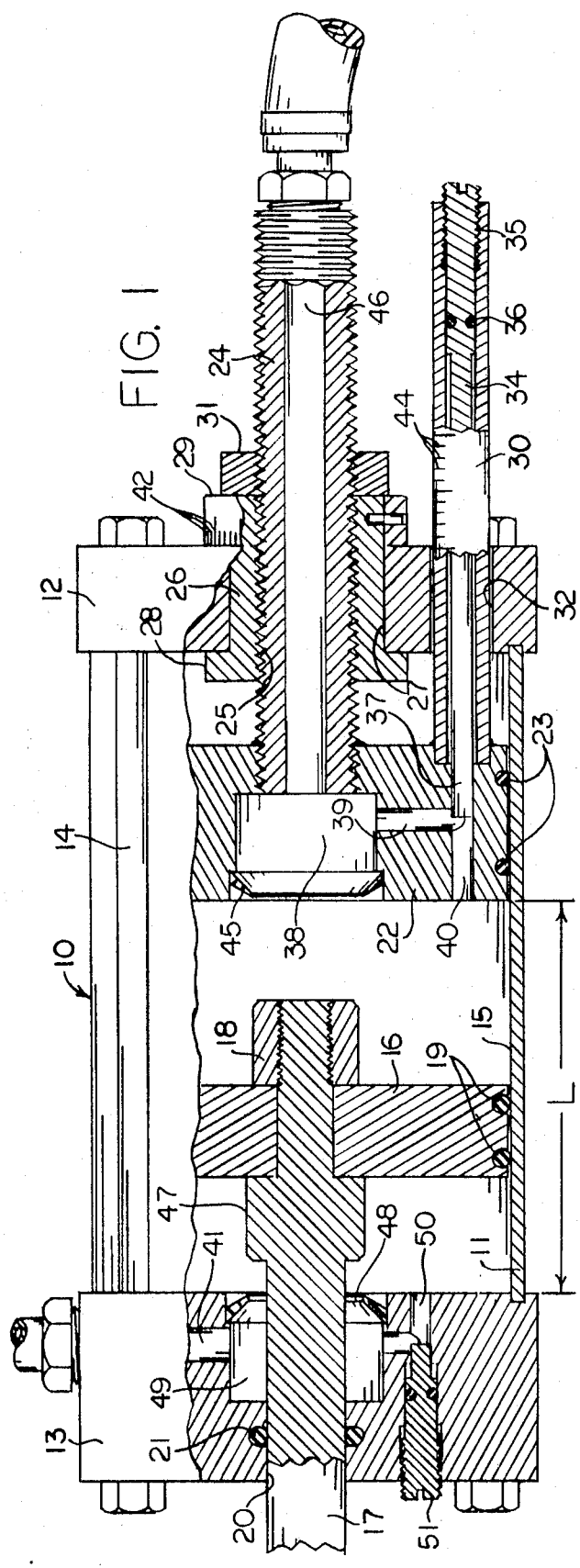
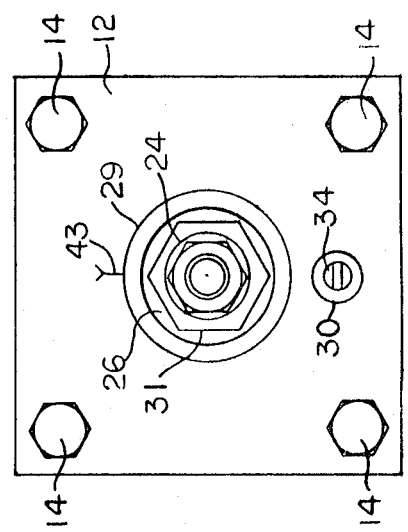
KENNETH B. SHARTZER
INVENTOR.
BY

ADJUSTABLE STROKE CYLINDERS

BACKGROUND OF THE INVENTION

1. Field of the Invention

The present invention relates generally to reciprocating pneumatic or hydraulic cylinders and more particularly to means for adjusting the stroke of such cylinders.

2. Description of the Prior Art

In many applications employing pneumatic or hydraulic cylinders, it is necessary to adjust the length of the stroke of such a cylinder in accordance with different operating requirements. Another highly desirable feature of many conventional hydraulic or pneumatic cylinders, is the provision of a cushioning device which gradually retards the movement of the piston as it approaches the end of its stroke and which preferably is adjustable so that this cushioning effect can be regulated in accordance with different loads and operating pressures. In some cases, the effective stroke of a cylinder is reduced simply by means of an adjustable blocking member on the piston rod, but such an arrangement either sacrifices the aforementioned cushioning effect or requires the use of an elaborate valving system to achieve that feature. Furthermore, in pneumatic systems or other related systems employing a compressible working fluid, any arrangement for shortening the stroke of the piston without decreasing the volumetric capacity of the cylinder can be very inefficient. Accordingly, various adjustable stroke cylinders have previously been devised in which the stroke adjustment has been accomplished by axially moving a cylinder head or by changing the effective axial length of the piston itself. In general, however, the stroke adjusting means heretofore employed in such variable stroke cylinders have either entirely precluded the inclusion of adjustable piston cushioning means or have provided that feature only at the expense of very complicated and expensive mechanisms.

SUMMARY OF THE INVENTION

In accordance with the present invention a simple and reliable hydraulic or pneumatic cylinder is provided with an axially adjustable internal head which permits highly accurate selective variation of the stroke of the cylinder piston and which also is provided with an adjustable cushioning device that can be regulated independently of the stroke adjustment to control a cushioning of the piston at the end of its stroke.

Various means for practicing the invention and other advantages and novel features thereof will be apparent from the following detailed description of an illustrative preferred embodiment of the invention, reference being made to the accompanying drawings in which like reference numerals denote like elements.

BRIEF DESCRIPTION OF THE DRAWINGS

In the accompanying drawings:

FIG. 1 is a partially cross sectioned longitudinal view of a reciprocating adjustable stroke cylinder unit according to a preferred embodiment of the present invention; and FIG. 2 is an elevational view of the adjusting rod end of the cylinder unit depicted in FIG. 1.

DESCRIPTION OF THE ILLUSTRATIVE PREFERRED EMBODIMENT

FIG. 1 of the accompanying drawings shows an adjustable stroke reciprocating fluid pressure cylinder unit designated generally by numeral 10, which includes a tubular cylinder 11 having cylinder heads 12 and 13 secured to its opposite ends by tie bolts 14. Reciprocally received in the cylinder 15 is a motive piston generally designated 16. Piston 16 is affixed to a piston rod 17 by a nut 18 and preferably is provided with one or more conventional sealing rings 19. The nut 18 is of cylindrical configuration and functions to provide cushioning of the piston at the end of its stroke in a manner which will be described in detail below. The piston rod 17 is received for sliding movement in an opening 20 in cylinder head 13 and suitable sealing means 21 are provided within the opening to prevent leakage of fluid from the cylinder unit.

Mounted between piston 16 and cylinder head 12 is a pistonlike adjustable internal head 22, which is also provided with suitable seals 23 to prevent leakage of fluid between its outer periphery and cylinder bore 15. The various seals illustrated in the drawing, including seals 23, are depicted as comprising conventional O-rings but other suitable sealing means obviously could be employed for the same purpose. Centrally disposed adjusting shaft 24 is threaded into the adjustable head 22 and is locked in place by brazing or other appropriate means to provide an immovable fluidtight connection between the adjusting shaft and the adjustable head. The opposite end of the adjusting shaft is received in mating engagement with the internal threads 25 of adjusting nut 26 and extends beyond the cylinder. Adjusting nut 26 in turn, is rotatably supported in central bore 27 of cylinder head 12 with its end flange 28 adjacent the inner face of that head. An external ring 29 is affixed to the outer end of the adjusting nut, thereby preventing the latter from moving axially by allowing it to be rotated by means of the ring. Accordingly, since adjustable head 22 is prevented from rotating within the mating cylinder by tubular member 30, described below, it will be apparent that the adjustable head 22 can be moved selectively to different axial positions in cylinder bore 15 by corresponding manual rotation of ring 29. After head 22 has been adjusted, internally threaded locknut 31 can be tightened against the adjacent end of the adjusting nut to prevent the stroke adjustment from changing under the influence of vibration and to eliminate end play between the matin threads of the adjusting shaft and the adjusting nut so that those threads will not be damaged by impacting against each other each time the piston approaches the end of its stroke.

The aforementioned tubular member 30 is fluidtight connected to adjustable head 22 in offcenter relation thereto and extends through opening 32 in cylinder head 12 with sufficient clearance to vent the internal cylinder chamber between the cylinder head and the adjustable internal head. A valve rod 34 is received within the bore of tubular member 30 and is in threaded engagement therewith at its outer end as shown at numeral 35. O-ring seal 36 encircles the shank of the valve rod adjacent threads 35, thus providing a fluidtight seal between the valve rod and the bore of tubular member 30. Accordingly, rotation of the slotted external end of rod 34 causes its opposite end 37 to be adjusted axially relative to adjustable head 22. A generally cylindrical recess 38 is provided in the adjustable head 22 facing piston 16. A port 39 extends from recess 38 in a generally radial direction and is in open communication with another port 40 extending axially of the adjustable head to provide a fluid exhaust passageway connecting recess 38 with the internal cylinder chamber defined between piston 16 and adjustable head 22. The corresponding end 37 of valve rod 34 is received in port 40 and is adapted to obstruct port 39 to an extent determined by the axial position of that rod.

When pneumatic or hydraulic fluid is introduced into the cylinder unit through passageway 41 in cylinder head 13, piston 16 is forced toward adjustable head 22. In the embodiment of the configuration shown in FIG. 1, the length of the piston stroke is represented by the distance L minus the axial length of the piston 16. Since the rotation of adjusting nut 26 in the appropriate direction varies the axial position of the adjustment head accordingly, it will be apparent that appropriate calibration indicia 42 can be inscribed about the periphery of ring 29 adjacent reference mark 43, shown in FIG. 2, to allow the piston stroke to be adjusted very accurately by reference to the coarser indicia 44 provided along tubular member 30 at increments corresponding to the thread pitch of the adjusting shaft.

Recess 38 in adjustable head 22 is provided with an annular ring type seal 45 adapted to accommodate the outer diameter of the cylindrical nut 18 at the end of piston rod 17. During the initial movement of the piston, the working fluid between the piston and the adjustable head is exhausted from the cylinder unit through bore 46 of adjusting shaft 24 via recess 38. When the piston approaches the end of its stroke, nut 18 enters seal 45 and defines a chamber within recess 38 which is in communication with the interior of the cylinder unit only through the fluid passageway provided by ports 39 and 40. Consequently, during the remainder of the piston stroke, the fluid exhausted through shaft bore 46 must pass through ports 39 and 40 at a rate determined by the adjustment of valve rod 34; whereby a cushioning effect is provided by slowing the movement of the piston during the final portion of its stroke. Since the outer end of valve rod 34 is at all times accessible, it will be apparent that the cushioning of the piston stroke can be adjusted at any time independently of the stroke adjustment of the cylinder unit.

To effect return movement of the piston, air or hydraulic fluid is introduced into the cylinder unit through the hollow bore 46 of adjusting shaft 24 as passageway 41 is simultaneously connected to an exhaust conduit by means of an appropriate control valve. As the piston approaches cylinder head 13, an enlarged cylindrical boss 47 on the piston rod enters ring seal 48 of recess 49 which is in communication with a cushioning port 50 provided with an adjustable valve member 51; thereby effecting cushioning of the piston in substantially the same manner previously described.

Although the illustrative embodiment of the invention employs a threaded adjusting rod to establish the position of the adjustable cylinder head, it will be apparent that other analogous means could be employed to adjust the latter either to any desired position or to different predetermined positions. Similarly, it should be recognized that the invention is compatible not only with the particular type of cushioning arrangement incorporated in the illustrative embodiment of the invention but also with other types of cushioning arrangements capable of being adjusted to provide different degrees of cushioning influence.

The invention has been described with reference to a specific illustrative embodiment thereof, but it will be apparent that variations and modifications can be effected within the spirit and scope of the invention as hereinbefore disclosed and as defined in the appended claims.

What is claimed is:

1. An adjustable stroke reciprocal fluid pressure cylinder unit comprising:
   a. a tubular cylinder provided with an internal cylinder bore,
   b. a first cylinder head secured to one end of said cylinder,
   c. a stroke-adjusting head received in said bore and movable axially therealong,
   d. a piston reciprocally mounted in said bore between said first cylinder head and said stroke-adjusting head,
   e. a piston rod connected to said piston and extending through said first cylinder head,
   f. stroke-adjusting means for adjustably positioning said stroke-adjusting head along said bore,
   g. cushioning elements carried by said piston and said stroke adjusting head, said cushioning elements being cooperable during the final portion of movement of said piston towards said stroke-adjusting head to define a chamber,
   h. chamber porting means providing a fluid exhaust passageway in communication with said chamber,
   i. cushion-adjusting means supported by and movable with said stroke adjusting head, said cushion adjusting means being accessible from the exterior of said cylinder unit for providing selective adjustment of the fluid conducting capacity of said fluid exhaust passageway,
   j. a second cylinder head secured to the other end of said cylinder opposite said first cylinder head, and
   k. means defining in said second cylinder head an offcenter opening adapted to slidably receive a tubular member rigidly attached to said stroke adjusting head to permit axial movement of said stroke adjusting head while preventing rotation thereof within said cylinder bore.

2. The invention defined by claim 1 in which said cushion adjusting means comprises a valve rod received by said tubular member, said valve rod projecting into said fluid exhaust passageway and extending from said stroke adjusting head through said offcenter opening beyond said first cylinder head.

3. The invention defined by claim 2 including: thread means establishing mating threaded engagement between said valve rod and said tubular member to permit said valve rod to be adjusted axially relative to said stroke adjusting head by rotational movement of said valve rod within said tubular member.

4. The invention defined by claim 1 wherein said stroke-adjusting means includes:
   1. a shaft centrally connected to and extending axially from said stroke-adjusting head through said second cylinder head, and
   2. shaft-adjusting means for adjustably locking said shaft to said second cylinder head to maintain said stroke-adjusting head at a corresponding position along said bore.

5. The invention defined by claim 4 in which said shaft-adjusting means includes:
   a. means defining external threads on said shaft,
   b. an internally threaded nut member threaded onto said shaft, and
   c. means rotatably supporting said nut member to said second cylinder head in axially immovable relation thereto, whereby rotational adjustment of said nut member effects corresponding axial adjustment of said stroke-adjusting head along said bore.

6. The invention defined by claim 5 including calibration indicia on said nut member cooperable with a reference means on said second cylinder head for indicating the correspondence between rotational adjustment of said nut member and the resulting axial adjustment of said stroke-adjusting head.

7. The invention defined by claim 5 in which said cushion-adjusting means comprises:
   a. an elongate tubular member rigidly attached to said stroke adjusting head in offcenter relation thereto,
   b. means defining in said second cylinder head an opening adapted to slidably receive said tubular member to permit axial movement of said stroke adjusting head while preventing rotational movement thereof, and
   c. a valve rod threadably received within said tubular member and adapted to obstruct said fluid exhaust passageway to an extent determined by the axial position of said valve rod relative to said stroke adjusting head, said valve rod being axially adjustable relative to said stroke adjusting head by rotation thereof within said tubular member.

8. The invention defined by claim 7 including means defining an operating fluid passageway extending axially through said shaft to establish fluid communication between the cushioning element carried by said stroke-adjusting head and the exterior of said cylinder unit.

* * * * *